(12) United States Patent
Knudsen

(10) Patent No.: US 11,148,789 B2
(45) Date of Patent: Oct. 19, 2021

(54) TAXIING SYSTEM FOR AN AIRCRAFT

(71) Applicant: The Boeing Company, Chicago, IL (US)

(72) Inventor: Peter J. Knudsen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 216 days.

(21) Appl. No.: 16/441,453

(22) Filed: Jun. 14, 2019

(65) Prior Publication Data

US 2020/0391856 A1 Dec. 17, 2020

(51) Int. Cl.
*B64C 25/40* (2006.01)
*B64C 25/44* (2006.01)
*B64C 25/36* (2006.01)
*B64D 27/02* (2006.01)

(52) U.S. Cl.
CPC ............ *B64C 25/405* (2013.01); *B64C 25/36* (2013.01); *B64C 25/44* (2013.01); *B64D 27/02* (2013.01)

(58) Field of Classification Search
CPC ........ B64C 25/36; B64C 25/44; B64C 25/405
See application file for complete search history.

(56) References Cited

U.S. PATENT DOCUMENTS

| | | | | |
|---|---|---|---|---|
| 3,762,670 A * | 10/1973 | Chillson | .................. | B64C 25/36 244/50 |
| 2010/0147995 A1 * | 6/2010 | Cros | ..................... | B64C 25/405 244/50 |
| 2010/0206980 A1 * | 8/2010 | Cros | ..................... | B64C 25/405 244/50 |
| 2011/0089289 A1 * | 4/2011 | Wilson | .................... | B64C 25/42 244/50 |
| 2011/0303785 A1 * | 12/2011 | Delloue | ................ | B64C 25/405 244/50 |
| 2012/0138734 A1 * | 6/2012 | Hissong | ................ | B64C 25/405 244/50 |
| 2014/0225421 A1 * | 8/2014 | Oswald | ................ | B64C 25/405 301/6.2 |
| 2015/0097077 A1 * | 4/2015 | Himmelmann | ....... | B64C 25/405 244/50 |
| 2015/0266567 A1 * | 9/2015 | Bouzmane | ............ | B64C 25/405 244/50 |
| 2017/0057624 A1 * | 3/2017 | Lo | .......................... | B60T 8/1703 |

(Continued)

OTHER PUBLICATIONS https://www.aviationpros.com/home/article/10383411/maintaining-skydrol-hydraulic-fluid ; David K. McCollum; "Maintaining Skydrol Hydraulic Fluid"; Sep. 26, 2006; Aviation Pros.*

(Continued)

*Primary Examiner* — Philip J Bonzell
*Assistant Examiner* — Tye William Abell
(74) *Attorney, Agent, or Firm* — Yee & Associates, P.C.

(57) ABSTRACT

A taxiing system for an aircraft is presented. The taxiing system comprises a hydraulic accumulator configured to receive an increase in hydraulic pressure from a hydraulic motor; a system inlet valve configured to provide hydraulic flow from a hydraulic system of the aircraft to the hydraulic motor; a flow control valve system comprising a plurality of valves configured to direct hydraulic flow between the hydraulic accumulator and the hydraulic motor; and the hydraulic motor connected to wheels of the aircraft and configured to drive or stop the wheels using movement of hydraulic flow in the taxiing system.

20 Claims, 5 Drawing Sheets

(56) References Cited

U.S. PATENT DOCUMENTS

2017/0217573 A1* 8/2017 Bouzmane ............. B64D 27/24
2019/0077500 A1* 3/2019 Kipp ..................... B60T 8/171

OTHER PUBLICATIONS

Croft, "Airbus Reveals Self-Powered Landing Gear, Braking Concept," FlightGlobal, Mar. 25, 2009, https://www.flightglobal.com/news/articles/airbus-reveals-self-powered-landing-gear-braking-co-324327/.

Gabel et al., "What is Regenerative Braking?," ThoughtCo., Feb. 28, 2019, https://www.thoughtco.com/what-is-regenerative-braking-85380.

Heney, "Fairfax Trash Vehicles Using Regenerative Braking System," Mobile Hydraulic Tips, Mar. 15, 2011, https://www.mobilehydraulictips.com/fairfax-trash-vehicles-using-regenerative-braking-system/.

Park et al., "Eaton Drops Hydraulic Hybrid System," Truckinginfo, Sep. 2013, https://www.truckinginfo.com/113384/eaton-drops-hydraulic-hybrid-system.

* cited by examiner

TAXIING SYSTEM FOR AN AIRCRAFT

BACKGROUND INFORMATION

1. Field

The present disclosure relates generally to aircraft and, more specifically, to a taxiing system for an aircraft.

2. Background

While an aircraft is on the ground, movement of the aircraft is either performed by a tug or under the aircraft's own power. Towing and push-back of the aircraft is performed by a tug. Movement of the aircraft under its own power is called taxiing.

During taxi, the aircraft's engines generate more energy than is used to propel the aircraft. In some instances, an aircraft waits to approach a destination within an airport such as a runway or a gate. As an aircraft waits, the aircraft idles with its engines running.

Therefore, it would be desirable to have a method and apparatus that take into account at least some of the issues discussed above, as well as other possible issues.

SUMMARY

An illustrative embodiment of the present disclosure provides a taxiing system for an aircraft. The taxiing system comprises a hydraulic accumulator, a system inlet valve, a flow control valve system, and a hydraulic motor. The hydraulic accumulator is configured to receive an increase in hydraulic pressure from the hydraulic motor. The system inlet valve is configured to provide hydraulic flow from a hydraulic system of the aircraft to the hydraulic motor. The flow control valve system comprises a plurality of valves configured to direct hydraulic flow between the hydraulic accumulator and the hydraulic motor. The hydraulic motor is connected to wheels of the aircraft and configured to drive or stop the wheels using movement of hydraulic flow in the taxiing system.

Another illustrative embodiment of the present disclosure provides an aircraft. The aircraft comprises the carbon brakes; engines; landing gear having wheels; and a taxiing system configured to propel and stop motion of the aircraft, the taxiing system comprising a hydraulic accumulator configured to receive an increase in hydraulic pressure from a hydraulic motor, a system inlet valve configured to provide hydraulic flow from a hydraulic system of the aircraft to the hydraulic motor, a flow control valve system comprising a plurality of valves configured to direct hydraulic flow between the hydraulic accumulator and the hydraulic motor, and the hydraulic motor connected to wheels of the aircraft and configured to drive or stop the wheels using movement of the hydraulic flow in the taxiing system.

Yet another illustrative embodiment of the present disclosure provides a method of taxiing an aircraft. Hydraulic flow is directed from a hydraulic accumulator to a hydraulic motor of a taxiing system to generate kinetic energy. Wheels of the aircraft are driven using the kinetic energy generated by the hydraulic motor. Movement of the aircraft is stopped using movement of the hydraulic flow in the taxiing system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
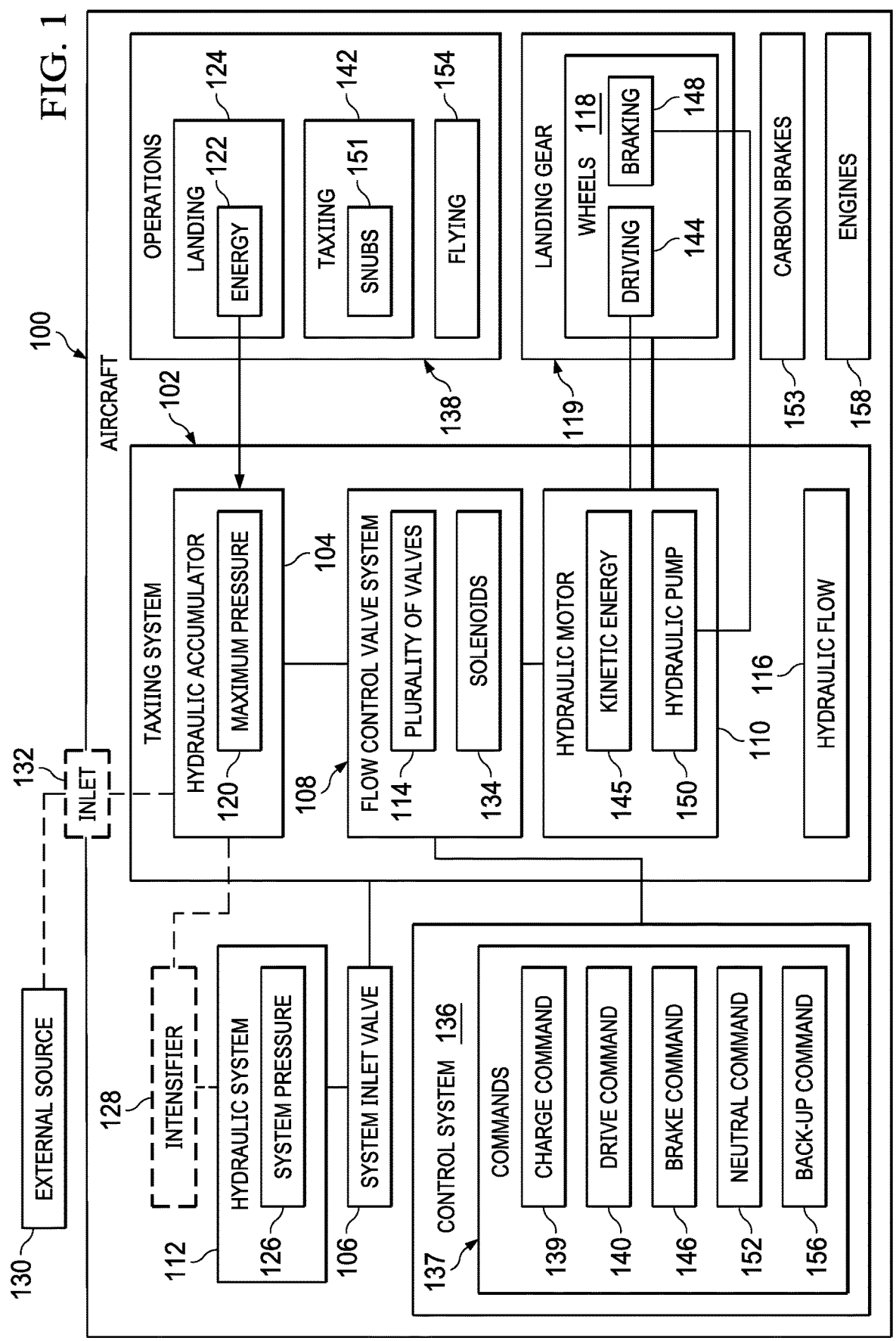
FIG. 1 is an illustration of a block diagram of an aircraft in which a taxiing system is present in accordance with an illustrative embodiment.

The illustrative embodiments recognize and take into account one or more different considerations. The illustrative embodiments recognize and take into account that as engines idle on an aircraft, fuel is expended. The illustrative embodiments recognize and take into account that it is desirable to reduce fuel waste for environmental and cost reasons. By reducing fuel waste, operating an aircraft is less expensive. By reducing fuel waste, fewer emissions are released for each flight. By reducing fuel waste, non-renewable resources are conserved.

The illustrative embodiments recognize and take into account that fuel burn during taxiing can be a significant amount of fuel expenditures for an aircraft. By reducing fuel burn during taxiing, the fuel used by an aircraft is advantageously reduced.

The illustrative embodiments recognize and take into account that operating an aircraft engine produces engine noise and emissions. The illustrative embodiments recognize and take into account that it may be desirable to reduce the cumulative engine noise at an airport. The illustrative embodiments recognize and take into account that it may be desirable to reduce the cumulative emissions at an airport.

The illustrative embodiments recognize and take into account that for aircraft brakes, an amount of brake wear is not correlated to the energy dissipated by the braking. The illustrative embodiments recognize and take into account that braking during taxiing can add considerable wear to aircraft brakes. The illustrative embodiments recognize and take into account that in some cases, braking during taxiing may be substantially the same amount of wear as multiple landings.

The illustrative embodiments recognize and take into account that it is desirable to cool down an engine between flights. The illustrative embodiments recognize and take into account that it may be desirable to power down the engines as soon as possible after a flight to allow the engines to cool.

The illustrative embodiments recognize and take into account that some ground vehicles include regenerative braking. In regenerative braking, kinetic energy of the ground vehicle is converted into a form that can be stored, such as electricity. Regenerative braking is most advantageous for ground vehicles that will frequently have in-city driving due to the frequency of stopping in-city.

The illustrative embodiments recognize and take into account that aircraft have different considerations than ground vehicles. Aircraft not only have significantly higher speeds, higher energy consumption, and higher mass, but are also subject to Federal Aviation Regulations. Further, aircraft do not spend a substantial amount of time stopping and starting motion on the ground.

The illustrative examples present a taxiing system for an aircraft. The taxiing system comprises a hydraulic accumulator configured to receive an increase in hydraulic pressure from a hydraulic motor, a system inlet valve configured to provide hydraulic flow from a hydraulic system of the aircraft to the hydraulic motor, a flow control valve system comprising a plurality of valves configured to direct hydraulic flow between the hydraulic accumulator and the hydraulic motor, and the hydraulic motor connected to wheels of the aircraft and configured to drive or stop the wheels using movement of hydraulic flow in the taxiing system. Using hydraulic flow in the taxiing system to drive or stop the wheels of the aircraft reduces at least one of fuel emissions, fuel waste, braking wear, or engine noise.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

Turning now to FIG. 1, an illustration of a block diagram of an aircraft in which a taxiing system is present is depicted in accordance with an illustrative embodiment. Aircraft 100 has taxiing system 102. Taxiing system 102 comprises hydraulic accumulator 104, system inlet valve 106, flow control valve system 108, and hydraulic motor 110.

Hydraulic accumulator 104 is configured to receive an increase in hydraulic pressure from hydraulic motor 110. System inlet valve 106 is configured to provide hydraulic flow from hydraulic system 112 of aircraft 100 to hydraulic motor 110. Flow control valve system 108 comprises plurality of valves 114 configured to direct hydraulic flow 116 between hydraulic accumulator 104 and hydraulic motor 110. Hydraulic motor 110 is connected to wheels 118 of landing gear 119 of aircraft 100 and configured to drive or stop wheels 118 using movement of hydraulic flow 116 in taxiing system 102.

Hydraulic accumulator 104 has maximum pressure 120. Maximum pressure 120 has any desirable value. Maximum pressure 120 is sufficient to drive wheels 118 of aircraft 100 using hydraulic motor 110. Hydraulic flow 116 within taxiing system 102 is controlled by flow control valve system 108. Hydraulic accumulator 104 reaches maximum pressure 120 from any desirable source.

Hydraulic motor 110 is connected to hydraulic accumulator 104 such that energy 122 from landing 124 aircraft 100 is stored in hydraulic accumulator 104. When aircraft 100 is landing 124, flow control valve system 108 sets plurality of valves 114 such that hydraulic flow 116 is into hydraulic accumulator 104.

Hydraulic system 112 of aircraft 100 has system pressure 126. System inlet valve 106 is configured to provide hydraulic flow from hydraulic system 112 of aircraft 100 to hydraulic motor 110 to continue driving wheels 118 of aircraft 100.

In some illustrative examples, hydraulic system 112 is connected to taxiing system 102 to provide hydraulic flow 116 to hydraulic accumulator 104. Hydraulic system 112 has system pressure 126.

In some illustrative examples, system pressure 126 is substantially the same as maximum pressure 120. In these illustrative examples, hydraulic system 112 may be connected to hydraulic accumulator 104 through an inlet.

In some illustrative examples, system pressure 126 is less than maximum pressure 120. In these illustrative examples, intensifier 128 allows hydraulic system 112 to provide hydraulic flow 116 to hydraulic accumulator 104 to reach maximum pressure 120. In these illustrative examples, intensifier 128 connects hydraulic accumulator 104 to hydraulic system 112 of aircraft 100.

In some illustrative examples, external source 130 supplies hydraulic pressure to hydraulic accumulator 104. As depicted, inlet 132 is connected to hydraulic accumulator 104 and is configured to receive hydraulic pressure from external source 130. External source 130 may take any desirable form. In some illustrative examples, external source 130 may be a part of another vehicle. In some illustrative examples, external source 130 may be part of an airport. In some illustrative examples, hydraulic accumulator 104 is "charged" by external source 130 while aircraft 100 is parked at an airport.

Flow control valve system 108 comprises plurality of valves 114 and solenoids 134 configured to actuate plurality of valves 114. Although solenoids 134 are depicted, plurality of valves 114 may be actuated in any desirable fashion. Plurality of valves 114 is configured to be operated to change hydraulic flow 116 within taxiing system 102.

Aircraft 100 has control system 136. Control system 136 is configured to send commands 137 to flow control valve system 108 to open or close plurality of valves 114 to change hydraulic flow 116 within taxiing system 102. Control system 136 sends commands 137 to flow control valve system 108 depending upon a desired operation of operations 138. Commands 137 are sent to set plurality of valves 114 to perform at least one operation of operations 138. As depicted, commands 137 include charge command 139, drive command 140, brake command 146, neutral command 152, and back-up command 156.

Plurality of valves 114 is configured to be actuated for at least one operation of operations 138. Plurality of valves 114 is configured to change hydraulic flow 116 within taxiing system 102 to perform at least one of moving aircraft 100 using hydraulic motor 110, braking aircraft 100 using taxiing system 102, or storing hydraulic pressure in hydraulic accumulator 104.

Taxiing system 102 is operated during landing 124 to store energy 122 from landing 124 in hydraulic accumulator 104. Hydraulic motor 110 is connected to hydraulic accumulator 104 such that energy 122 from landing 124 aircraft 100 is stored in hydraulic accumulator 104. In some illustrative examples, to store energy 122, control system 136 sends charge command 139.

Control system 136 sends drive command 140 to flow control valve system 108 to perform taxiing 142. Drive command 140 instructs solenoids 134 to set plurality of valves 114 to direct hydraulic flow 116 from hydraulic accumulator 104 to hydraulic motor 110 connected to wheels 118. Driving 144 of wheels 118 of aircraft 100 during taxiing 142 is performed using kinetic energy 145 generated by hydraulic motor 110 from hydraulic flow 116 from hydraulic accumulator 104. In some illustrative examples, system pressure 126 from hydraulic system 112 supplements hydraulic flow 116 from hydraulic accumulator 104 in driving 144 wheels 118.

Control system 136 sends brake command 146 to flow control valve system 108 to perform braking 148 of wheels 118 during taxiing 142. During braking 148, aircraft 100 is stopped using movement of hydraulic flow 116 in taxiing system. Braking 148 is performed by pumping hydraulic flow 116 into hydraulic accumulator 104 by hydraulic motor 110. When hydraulic motor 110 pumps hydraulic flow 116 to hydraulic accumulator 104, hydraulic motor 110 acts as hydraulic pump 150. As hydraulic motor 110 can act as hydraulic pump 150, in some illustrative examples, hydraulic motor 110 may be referred to as hydraulic pump/motor. Snubs 151 of carbon brakes 153 during taxiing 142 are reduced or eliminated when taxiing system 102 performs braking 148 of wheels 118. In some illustrative examples, when hydraulic motor 110 pumps hydraulic flow 116 to hydraulic accumulator 104, aircraft 100 may be stopped without engaging carbon brakes 153. Although taxiing system 102 performs braking 148 of wheels 118, carbon brakes 153 are still available if braking 148 using carbon brakes 153 is desired. In some illustrative examples, hydraulic motor 110 pumps hydraulic flow 116 to hydraulic accumulator 104 and carbon brakes 153 are engaged to stop aircraft 100.

Control system 136 sends neutral command 152 when taxiing system 102 is not actively driving 144 or braking 148 wheels 118. In some illustrative examples, neutral command 152 sets plurality of valves 114 such that hydraulic accumulator 104 maintains its pressure. In some illustrative examples, neutral command 152 sets plurality of valves 114 such that hydraulic flow 116 is neutral. In some illustrative examples, control system 136 sends neutral command 152 prior to aircraft 100 flying 154. In some illustrative examples, neutral command 152 and charge command 139 are the same.

In some illustrative examples, taxiing system 102 is used for backing aircraft 100 from a gate. In some illustrative examples, control system 136 sends drive command 140 regardless of the direction of movement of aircraft 100. In these illustrative examples, control system 136 sends drive command 140 for backing up aircraft 100 from a gate. In these illustrative examples, hydraulic flow 116 within taxiing system 102 to hydraulic motor 110 is the same for taxiing 142 and backing-up of aircraft 100. In these illustrative examples, additional non-depicted mechanical components may reverse rotational direction of wheels 118. In other illustrative examples, control system 136 sends back-up command 156 to back up aircraft 100 using taxiing system 102.

Taxiing system 102 performs taxiing 142 without energy from engines 158. By using taxiing system 102 to perform taxiing 142, fuel used by engines 158 during taxiing 142 is reduced. In some illustrative examples, taxiing system 102 allows aircraft 100 to perform taxiing 142 without engaging engines 158.

The illustration of aircraft 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although only hydraulic accumulator 104 is shown, additional hydraulic accumulators may be present. For example, a second hydraulic accumulator may be present to store additional amounts of energy 122 from landing 124.

As another example, at least one of inlet 132 or intensifier 128 may be optional. For example, in some illustrative examples, taxiing system 102 may not be configured to receive hydraulic pressure from external source 130. As another example, system pressure 126 may be substantially the same as maximum pressure 120 and intensifier 128 is not present. As yet another example, hydraulic system 112 may not be connected to hydraulic accumulator 104.

Figure 2:
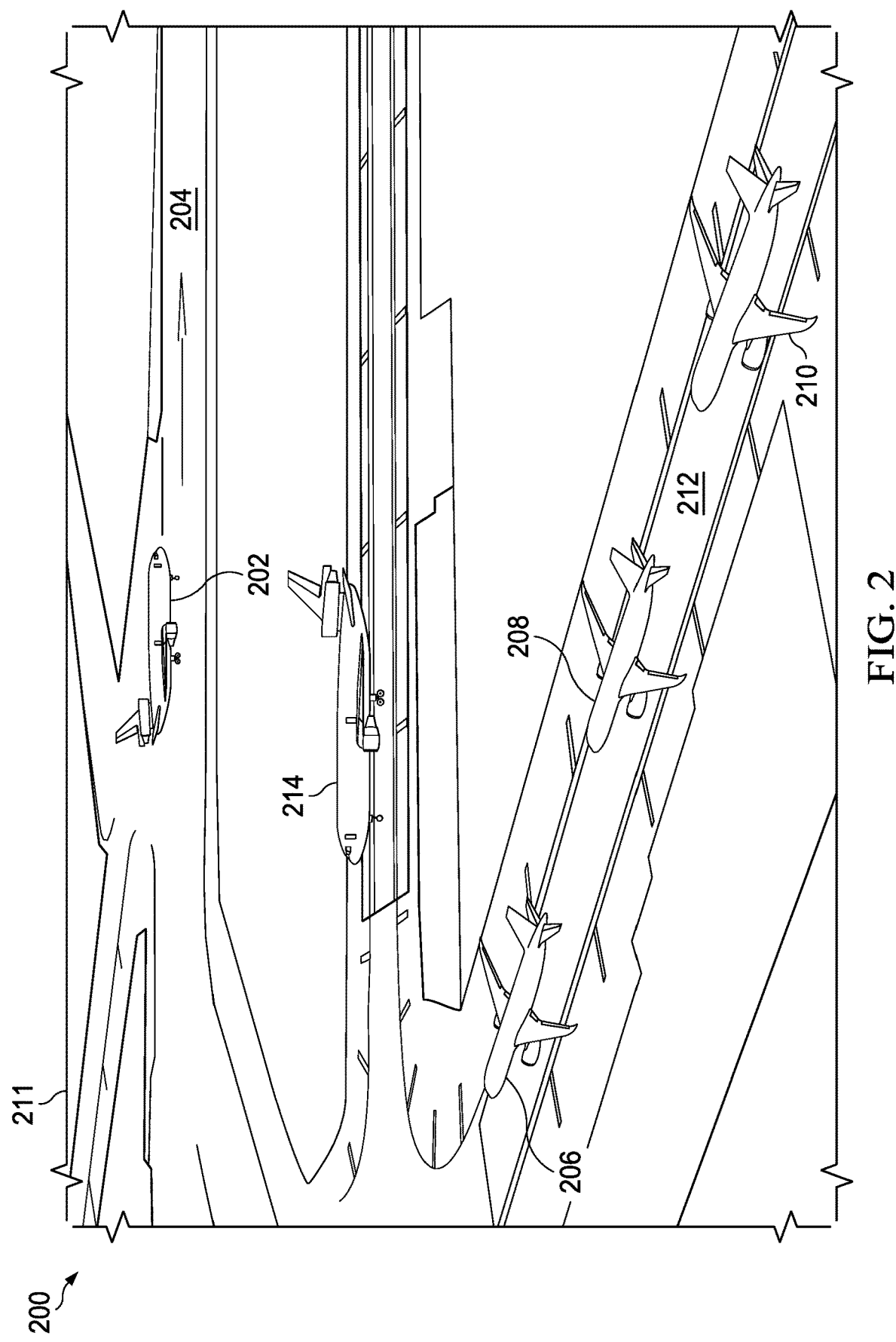
FIG. 2 is an illustration of a plurality of aircraft waiting to taxi to or from a runway in accordance with an illustrative embodiment.

Turning now to FIG. 2, an illustration of a plurality of aircraft waiting to taxi to or from a runway is depicted in accordance with an illustrative embodiment. In view 200, aircraft 202 is present on runway 204. Aircraft 202 is preparing to takeoff on runway 204. Aircraft 202 has its engines running in preparation for takeoff.

Each of aircraft 206, aircraft 208, and aircraft 210 are present on taxiway 212. Each of aircraft 206, aircraft 208, and aircraft 210 are waiting to taxi to another location in airport 211. If any of aircraft 206, aircraft 208, or aircraft 210 are conventional aircraft, the respective conventional aircraft will idle with the respective conventional aircraft's engines running.

Any of aircraft 202, aircraft 206, aircraft 208, or aircraft 210 may be aircraft 100 of FIG. 1. Any of aircraft 202, aircraft 206, aircraft 208, or aircraft 210 may have taxiing system 102 of FIG. 1.

When aircraft 206 has a taxiing system with a hydraulic accumulator, aircraft 206 is configured to taxi without operating the engines of aircraft 206. When aircraft 208 has a taxiing system with a hydraulic accumulator, aircraft 208 is configured to taxi without operating the engines of aircraft 208. When aircraft 210 has a taxiing system with a hydraulic accumulator, aircraft 210 is configured to taxi without operating the engines of aircraft 210. When the engines of an aircraft are not operated, fuel consumption of the respective aircraft is reduced.

For each aircraft of aircraft 206, aircraft 208, and aircraft 210 that has a taxiing system with a hydraulic accumulator, idling emissions in airport 211 are reduced. For each aircraft of aircraft 206, aircraft 208, and aircraft 210 that has a taxiing system with a hydraulic accumulator, engine noise in airport 211 is reduced.

When aircraft 206 has a taxiing system with a hydraulic accumulator, the taxiing system stops movement of aircraft 206 using movement of the hydraulic flow in the taxiing system. In some illustrative examples, when aircraft 206 has a taxiing system with a hydraulic accumulator, aircraft 206 is configured to taxi without engaging the carbon brakes of aircraft 206. When aircraft 206 is configured to taxi without engaging the carbon brakes of aircraft 206, the carbon brakes of aircraft 206 may be replaced less frequently, thus reducing maintenance costs of aircraft 206. Although aircraft 206 is configured to stop without engaging the carbon brakes of aircraft 206, carbon brakes are still available and prepared for braking if desired.

When aircraft 208 has a taxiing system with a hydraulic accumulator, the taxiing system stops movement of aircraft 208 using movement of the hydraulic flow in the taxiing system. In some illustrative examples, when aircraft 208 has a taxiing system with a hydraulic accumulator, aircraft 208 is configured to taxi without engaging the carbon brakes of aircraft 208. When aircraft 208 is configured to taxi without engaging the carbon brakes of aircraft 208, the carbon brakes of aircraft 208 may be replaced less frequently, thus reducing maintenance costs of aircraft 208. Although aircraft 208 is configured to stop without engaging the carbon brakes of aircraft 208, carbon brakes are still available and prepared for braking if desired.

When aircraft 210 has a taxiing system with a hydraulic accumulator, the taxiing system stops movement of aircraft 210 using movement of the hydraulic flow in the taxiing system. In some illustrative examples, when aircraft 210 has a taxiing system with a hydraulic accumulator, aircraft 210 is configured to taxi without engaging the carbon brakes of aircraft 210. When aircraft 210 is configured to taxi without engaging the carbon brakes of aircraft 210, the carbon brakes of aircraft 210 may be replaced less frequently, thus reducing maintenance costs of aircraft 210. Although aircraft 210 is configured to stop without engaging the carbon brakes of aircraft 210, carbon brakes are still available and prepared for braking if desired.

Aircraft 214 is also present in view 200. Aircraft 214 is a larger aircraft than any of aircraft 206, aircraft 208, or aircraft 210. In some illustrative examples, aircraft 214 may be aircraft 100 of FIG. 1. In some illustrative examples, aircraft 214 has taxiing system 102 of FIG. 1. When aircraft 214 has a taxiing system with a hydraulic accumulator, aircraft 214 is configured to taxi without operating the engines of aircraft 214. When the engines of aircraft 214 are not operated, fuel consumption of aircraft 214 is reduced. When aircraft 214 has a taxiing system with a hydraulic accumulator, idling emissions in airport 211 are further reduced. When aircraft 214 has a taxiing system with a hydraulic accumulator, engine noise in airport 211 is further reduced.

Figure 3:
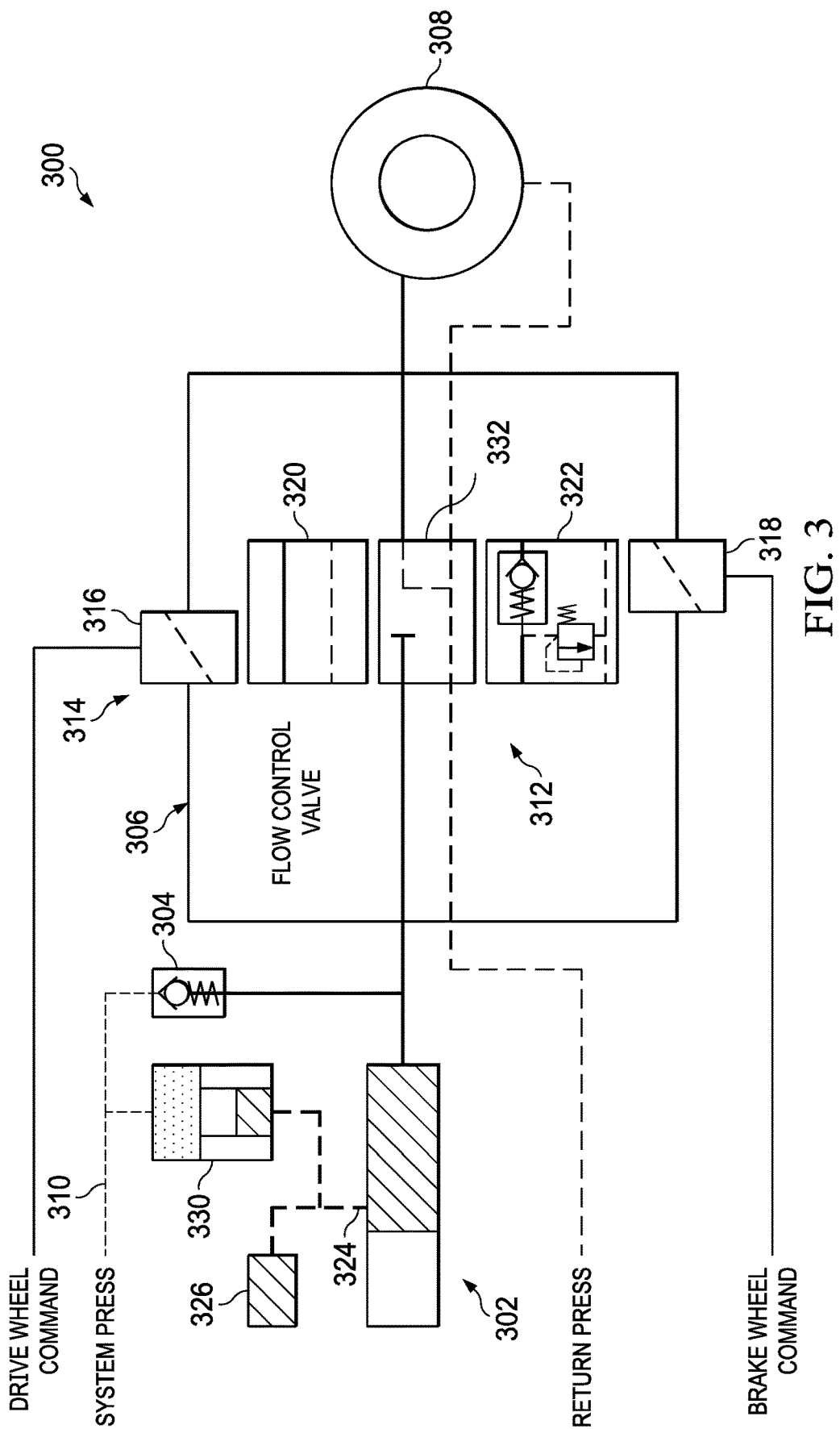
FIG. 3 is an illustration of a diagram of a taxiing system in accordance with an illustrative embodiment.

Turning now to FIG. 3, an illustration of an operational diagram of a taxiing system is depicted in accordance with an illustrative embodiment. Taxiing system 300 is one representation of an operational diagram of taxiing system 102 of FIG. 1. Taxiing system 300 is an illustrative example of a taxiing system that may be implemented in at least one of aircraft 202, aircraft 206, aircraft 208, aircraft 210, or aircraft 214 of FIG. 2.

Taxiing system 300 is configured to allow an aircraft, such as aircraft 100 of FIG. 1, to taxi without engaging its carbon brakes. Taxiing system 300 is configured to allow an aircraft, such as aircraft 100 of FIG. 1, to taxi without using power from its engines. Taxiing system 300 stores energy from landing the aircraft.

Taxiing system 300 comprises hydraulic accumulator 302, system inlet valve 304, flow control valve system 306, and hydraulic motor 308. Hydraulic accumulator 302 is configured to receive an increase in hydraulic pressure from hydraulic motor 308. System inlet valve 304 is configured to provide hydraulic flow from hydraulic system 310 of the aircraft to hydraulic motor 308. Flow control valve system 306 comprises plurality of valves 312 configured to direct hydraulic flow between hydraulic accumulator 302 and hydraulic motor 308. Hydraulic motor 308 is connected to wheels (not depicted) of the aircraft (not depicted) and configured to drive or stop the wheels using movement of hydraulic flow in taxiing system 300.

Energy is stored from landing the aircraft in hydraulic accumulator 302 prior to taxiing. During landing, hydraulic motor 308 directs hydraulic flow into hydraulic accumulator 302. Energy stored in hydraulic accumulator 302 is used to drive wheels of the aircraft. Hydraulic flow from hydraulic accumulator 302 to hydraulic motor 308 generates kinetic energy to drive the wheels of the aircraft.

In some illustrative examples, hydraulic motor 308 acts as a hydraulic pump to pump hydraulic fluid back into hydraulic accumulator 302. Pumping hydraulic fluid back into hydraulic accumulator 302 stops movement of the aircraft. In some illustrative examples, pumping hydraulic fluid back into hydraulic accumulator 302 stops movement of the aircraft without engaging carbon brakes of the aircraft. Although hydraulic accumulator 302 is configured to stop movement of the aircraft without engaging the carbon brakes, the carbon brakes are still available for use if desired. In some illustrative examples, carbon brakes are used in conjunction with hydraulic accumulator 302.

Plurality of valves 312 is configured to be operated to change hydraulic flow within taxiing system 300. Plurality of valves 312 is configured to change the hydraulic flow within taxiing system 300 to perform at least one of moving the aircraft using hydraulic motor 308, braking the aircraft using taxiing system 300, or storing hydraulic pressure in hydraulic accumulator 302.

Plurality of valves 312 are actuated to move the aircraft, brake the aircraft, or store hydraulic pressure in hydraulic accumulator 302. Actuating plurality of valves 312 directs hydraulic flow between hydraulic accumulator 302 and hydraulic motor 308.

As depicted, flow control valve system 306 comprises solenoids 314. Solenoids 314 include solenoid 316 and solenoid 318. Solenoid 316 receives a drive command to direct hydraulic pressure from hydraulic accumulator 302 to hydraulic motor 308. Setting 320 is representative of an arrangement of flow control valve system 306 for taxiing the aircraft. Solenoid 318 receives a brake command to pump hydraulic fluid into hydraulic accumulator 302. Setting 322 is representative of an arrangement of flow control valve system 306 for braking an aircraft.

Hydraulic accumulator 302 may receive hydraulic flow from additional sources. As depicted, inlet 324 is connected to hydraulic accumulator 302 and configured to receive hydraulic pressure from external source 326. As depicted, inlet 324 is connected to hydraulic accumulator 302 and configured to receive hydraulic pressure from hydraulic system 310 of the aircraft.

Intensifier 330 is present in taxiing system 300. When system pressure of hydraulic system 310 of the aircraft is lower than a maximum pressure of hydraulic accumulator 302, intensifier 330 is present in taxiing system 300. In some illustrative examples, the system pressure of hydraulic system 310 of the aircraft is substantially the same as the maximum pressure of hydraulic accumulator 302. In these illustrative examples, intensifier 330 may not be present in taxiing system 300.

Setting 332 is representative of a neutral arrangement of flow control valve system 306. Setting 332 is representative of an arrangement for flow control valve system 306 while the aircraft is in flight. In some illustrative examples, setting 332 is representative of an arrangement for flow control valve system 306 during landing of the aircraft.

The illustration of taxiing system 300 in FIG. 3 is not meant to imply physical or architectural limitations to the manner in which an illustrative embodiment may be implemented. Other components in addition to or in place of the ones illustrated may be used. Some components may be unnecessary.

For example, intensifier 330 may not be present in some illustrative examples. In other illustrative examples, inlet 324 may only be connected to one of external source 326 or hydraulic system 310. In some non-depicted examples, inlet 324 may not be present.

As another example, flow control valve system 306 may have more settings than depicted. For example, flow control valve system 306 may have a back-up setting. As yet another example, although solenoids 314 are depicted, any desirable actuation may be present.

Figure 4:
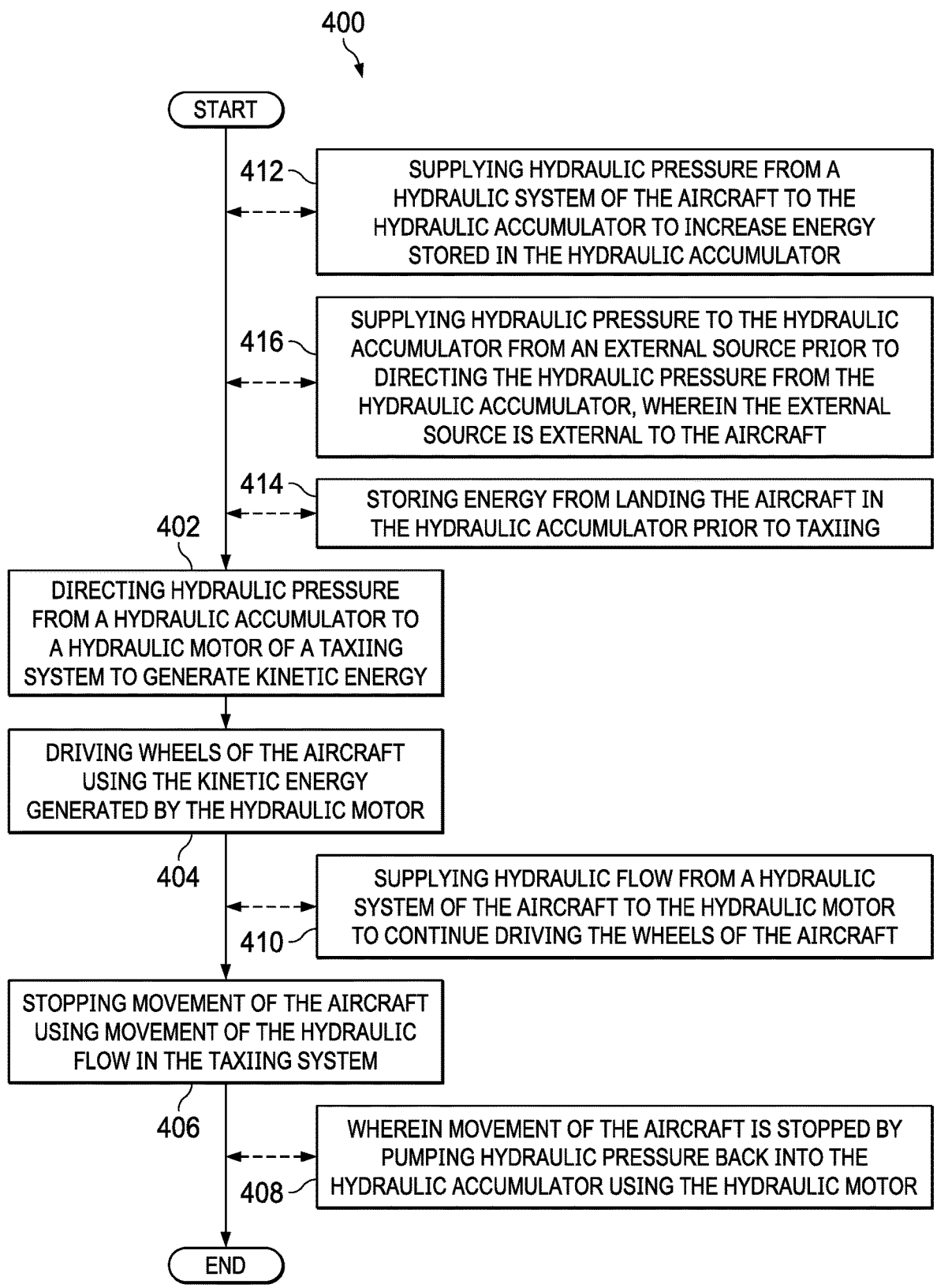
FIG. 4 is an illustration of a flowchart of a method of taxiing an aircraft in accordance with an illustrative embodiment.

Turning now to FIG. 4, an illustration of a flowchart of a method of taxiing an aircraft is depicted in accordance with an illustrative embodiment. Method 400 may be performed using taxiing system 102 of FIG. 1. Method 400 may be implemented in at least one of aircraft 202, aircraft 206, aircraft 208, aircraft 210, or aircraft 214 of FIG. 2. Method 400 may be performed using taxiing system 300 of FIG. 3.

Method 400 directs hydraulic flow from a hydraulic accumulator to a hydraulic motor of a taxiing system to generate kinetic energy (operation 402). Method 400 drives wheels of the aircraft using the kinetic energy generated by the hydraulic motor (operation 404). Method 400 stops movement of the aircraft using movement of the hydraulic flow in the taxiing system (operation 406). In some illustrative examples, method 400 stops movement of the aircraft using movement of the hydraulic flow in the taxiing system without engaging carbon brakes of the aircraft. Afterwards, the method terminates.

In some illustrative examples, movement of the aircraft is stopped by pumping hydraulic fluid back into the hydraulic accumulator using the hydraulic motor (operation 408). By pumping the hydraulic fluid back into the hydraulic accumulator, the aircraft is braked using the hydraulic flow of the taxiing system.

In some illustrative examples, method 400 supplies hydraulic flow from a hydraulic system of the aircraft to the hydraulic motor to continue driving the wheels of the aircraft (operation 410). By supplying hydraulic flow from the hydraulic system of the aircraft, a taxiing system of the aircraft may continue to taxi the aircraft under hydraulic power when stored hydraulic energy in the hydraulic accumulator is no longer at maximum pressure. In some illustrative examples, by supplying hydraulic flow from the hydraulic system of the aircraft, the engines are not used to propel the aircraft during taxiing.

In some illustrative examples, method 400 supplies hydraulic pressure from a hydraulic system of the aircraft to the hydraulic accumulator to increase energy stored in the hydraulic accumulator (operation 412). When there are multiple methods of increasing energy stored in the hydraulic accumulator, the hydraulic accumulator may be "charged" prior to taxiing independently of landing energy. In some illustrative examples, taxiing the aircraft to a gate uses the energy stored in the hydraulic accumulator from landing the aircraft. In some of these illustrative examples, hydraulic pressure from the hydraulic system is used to "charge" the hydraulic accumulator. The energy stored in the hydraulic accumulator from the hydraulic system of the aircraft is used to taxi the aircraft prior to takeoff.

In some illustrative examples, method 400 stores energy from landing the aircraft in the hydraulic accumulator prior to taxiing (operation 414). In these illustrative examples, the energy stored from landing the aircraft is used to taxi the aircraft after landing.

In some illustrative examples, method 400 supplies hydraulic pressure to the hydraulic accumulator from an external source prior to directing the hydraulic pressure from the hydraulic accumulator, wherein the external source is external to the aircraft (operation 416). The external source may take any desirable form. In some illustrative examples, the external source may be part of another vehicle. In some illustrative examples, the external source may be part of an airport. In some illustrative examples, the hydraulic accumulator is "charged" by an external source while the aircraft is parked at an airport. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. Some blocks may be optional. For example, operations 408 through 416 of FIG. 4 may be optional.

Figure 5:
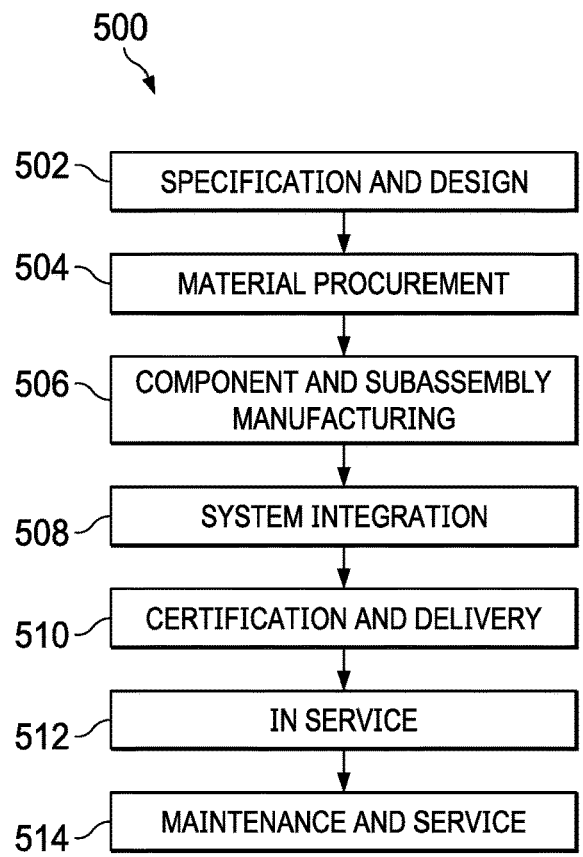
FIG. 5 is an illustration of an aircraft manufacturing and service method in a form of a block diagram in accordance with an illustrative embodiment.
Figure 6:
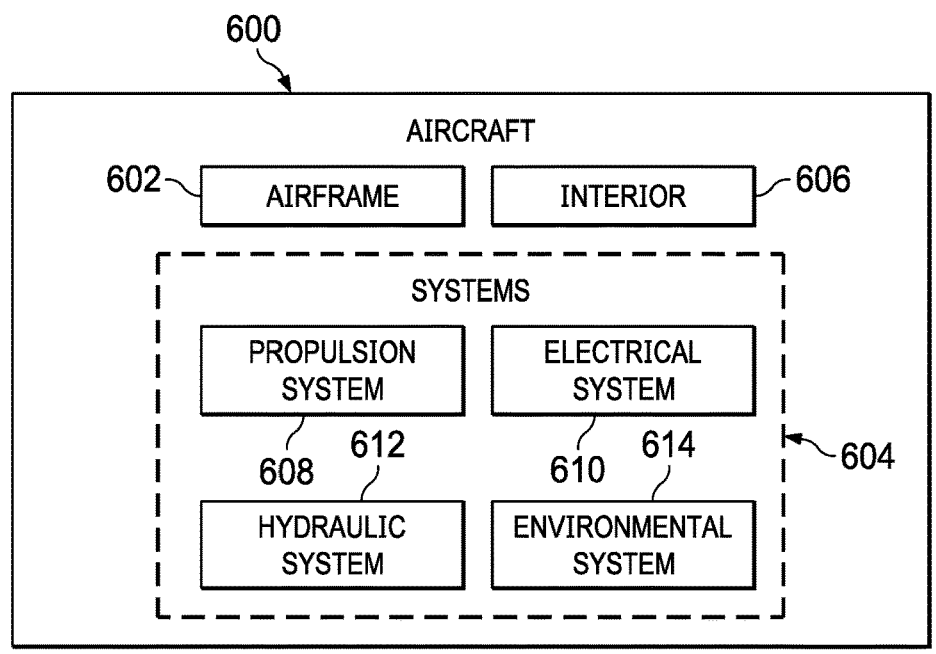
FIG. 6 is an illustration of an aircraft in a form of a block diagram in which an illustrative embodiment may be implemented.

Illustrative embodiments of the present disclosure may be described in the context of aircraft manufacturing and service method 500 as shown in FIG. 5 and aircraft 600 as shown in FIG. 6. Turning first to FIG. 5, an illustration of an aircraft manufacturing and service method is depicted in accordance with an illustrative embodiment. During pre-production, aircraft manufacturing and service method 500 may include specification and design 502 of aircraft 600 in FIG. 6 and material procurement 504.

During production, component and subassembly manufacturing 506 and system integration 508 of aircraft 600 takes place. Thereafter, aircraft 600 may go through certification and delivery 510 in order to be placed in service 512. While in service 512 by a customer, aircraft 600 is scheduled for routine maintenance and service 514, which may include modification, reconfiguration, refurbishment, or other maintenance and service.

Each of the processes of aircraft manufacturing and service method 500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 6, an illustration of an aircraft is depicted in which an illustrative embodiment may be implemented. In this example, aircraft 600 is produced by aircraft manufacturing and service method 500 of FIG. 5 and may include airframe 602 with plurality of systems 604 and interior 606. Examples of systems 604 include one or more of propulsion system 608, electrical system 610, hydraulic system 612, and environmental system 614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 500. One or more illustrative embodiments may be manufactured or used during at least one of component and subassembly manufacturing 506, system integration 508, in service 512, or maintenance and service 514 of FIG. 5. For example, taxiing system 102 may be manufactured or installed during component and subassembly manufacturing 506. Taxiing system 102 may be connected to hydraulic system 612 of aircraft 600 during component and subassembly manufacturing 506. As an example, method 400 may be used during in service 512 to taxi aircraft 600. As another illustrative example, taxiing system 102 may be installed during maintenance and service 514. Taxiing system 102 may reduce frequency of maintenance and service 514 for other components of aircraft 600, such as carbon brakes. In some illustrative examples, method 400 may be used to operate portions of aircraft 600 such as portions of propulsion system 608. In some illustrative examples, method 400 may utilize hydraulic system 612 of aircraft 600. Further, landing gear 119 of FIG. 1 is part of or connected to airframe 602 of aircraft 600.

The illustrative examples provide a taxiing system for an aircraft. The taxiing system uses hydraulic flow to perform at least one of taxiing the aircraft or braking the aircraft. The taxiing system stores hydraulic energy from at least one of landing energy, an external source, or the hydraulic system of the aircraft.

By employing the taxiing system, the aircraft may taxi without running the aircraft engines. The illustrative examples reduce the fuel consumed during taxiing of the aircraft. The illustrative examples reduce the fuel emissions generated by an aircraft during taxiing. The illustrative examples may reduce the wear on the carbon brakes of an aircraft due to taxiing. In some illustrative examples, the carbon brakes of an aircraft may be used for more flights due to braking using the taxiing system.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A taxiing system for an aircraft, the taxiing system comprising:
   a hydraulic accumulator configured to receive an increase in hydraulic pressure from a hydraulic motor;
   a system inlet valve configured to provide hydraulic flow from a hydraulic system of the aircraft to the hydraulic accumulator and the hydraulic motor, wherein the hydraulic system of the aircraft is external to the taxiing system;
   a flow control valve system comprising a plurality of valves configured to direct hydraulic flow between the hydraulic accumulator and the hydraulic motor; and
   the hydraulic motor connected to wheels of the aircraft and configured to drive or stop the wheels using movement of hydraulic flow in the taxiing system; and
   an inlet connected to the hydraulic accumulator and configured to receive hydraulic pressure from a source external to both the taxing system and the aircraft, wherein the hydraulic pressure from the source has a pressure value sufficient to drive the wheels of the aircraft from a parked position.

2. The taxiing system of claim 1 further comprising:
   an intensifier directly connecting the hydraulic accumulator to the hydraulic system of the aircraft.

3. The taxiing system of claim 1, wherein the hydraulic motor is connected to the hydraulic accumulator such that energy from landing the aircraft is stored in the hydraulic accumulator.

4. A method of taxiing an aircraft, the method comprising:
   directing hydraulic flow from a hydraulic accumulator to a hydraulic motor of a taxiing system to generate kinetic energy;
   supplying hydraulic pressure from a hydraulic system of the aircraft to the hydraulic accumulator, wherein the hydraulic system of the aircraft is external to the taxiing system;
   driving wheels of the aircraft using the kinetic energy generated by the hydraulic motor; and
   stopping movement of the aircraft using movement of the hydraulic flow in the taxiing system;
   wherein the hydraulic accumulator is connected to an inlet, the inlet configured to receive hydraulic pressure from a source external to both the taxing system and the aircraft, wherein the hydraulic pressure from the source has a pressure value sufficient to drive the wheels of the aircraft from a parked position.

5. The taxiing system of claim 1, wherein the plurality of valves is configured to be operated to change hydraulic flow within the taxiing system.

6. The taxiing system of claim 5, wherein the plurality of valves is configured to change the hydraulic flow within the taxiing system to perform at least one of moving the aircraft using the hydraulic motor, braking the aircraft using the taxiing system, or storing hydraulic pressure in the hydraulic accumulator.

7. An aircraft comprising:
   carbon brakes;
   engines;
   landing gear having wheels; and
   a taxiing system configured to propel and stop motion of the aircraft, the taxiing system comprising a hydraulic accumulator configured to receive an increase in hydraulic pressure from a hydraulic motor, a system inlet valve configured to provide hydraulic flow from a hydraulic system of the aircraft to the hydraulic motor, wherein the hydraulic system of the aircraft is external to the taxiing system, a flow control valve system comprising a plurality of valves configured to direct hydraulic flow between the hydraulic accumulator and the hydraulic motor, and the hydraulic motor connected to wheels of the aircraft and configured to drive or stop the wheels using movement of the hydraulic flow in the taxiing system; and an inlet connected to the hydraulic accumulator and configured to receive hydraulic pressure from a source external to both the taxing system and the aircraft, wherein the hydraulic pressure from the source has a pressure value sufficient to drive the wheels of the aircraft from a parked position.

8. The aircraft of claim 7, wherein the hydraulic motor is connected to the hydraulic accumulator such that energy from landing the aircraft is stored in the hydraulic accumulator.

9. The aircraft of claim 7 further comprising:
the hydraulic system of the aircraft, wherein the hydraulic system is connected to the hydraulic accumulator by an intensifier.

10. The aircraft of claim 9, wherein the inlet is configured to receive the hydraulic flow from the source without passing through the intensifier.

11. The aircraft of claim 7 further comprising:
a control system configured to send commands to the flow control valve system to open or close the plurality of valves to change the hydraulic flow within the taxiing system.

12. The aircraft of claim 11, wherein the control system sends commands to perform at least one of moving the aircraft, braking the aircraft, or storing hydraulic pressure in the hydraulic accumulator.

13. The method of claim 4, wherein an intensifier directly connects the hydraulic accumulator to the hydraulic system of the aircraft.

14. The method of claim 4, further comprising:
supplying hydraulic flow from the hydraulic system of the aircraft to the hydraulic motor to continue driving the wheels of the aircraft.

15. The method of claim 4, wherein supplying hydraulic pressure from the hydraulic system of the aircraft to the hydraulic accumulator increases energy stored in the hydraulic accumulator.

16. The method of claim 4, further comprising:
storing energy from landing the aircraft in the hydraulic accumulator prior to taxiing.

17. The method of claim 4, further comprising:
supplying the hydraulic pressure to the hydraulic accumulator from the source prior to directing the hydraulic pressure from the hydraulic accumulator.

18. The taxiing system of claim 1, further comprising:
an intensifier directly connecting the hydraulic accumulator to the hydraulic system of the aircraft; and the inlet is configured to receive hydraulic pressure from the intensifier and further configured to receive the hydraulic pressure from the source without passing through the intensifier.

19. The method of claim 4 wherein movement of the aircraft is stopped by pumping hydraulic fluid back into the hydraulic accumulator using the hydraulic motor.

20. The method of claim 19, wherein the movement of the aircraft is stopped without engaging carbon brakes of the aircraft.

* * * * *